US012810331B2

(12) United States Patent
Yoon et al.

(10) Patent No.: US 12,810,331 B2
(45) Date of Patent: Nov. 24, 2026

(54) PROCESSING ESTIMATE CALCULATION DEVICE USING ARTIFICIAL INTELLIGENCE AND OPERATION METHOD THEREOF

(71) Applicant: BOLT&NUT CO., LTD, Mapo-gu (KR)

(72) Inventors: Gi yul Yoon, Yeongdeungpo-gu (KR); Jae Ik Yoo, Seongbuk-gu (KR); So Myung Kim, Namyangju-si (KR)

(73) Assignee: BOLT&NUT CO., LTD, Seoul (KR)

( * ) Notice: Subject to any disclaimer, the term of this patent is extended or adjusted under 35 U.S.C. 154(b) by 0 days.

(21) Appl. No.: 18/872,533

(22) PCT Filed: Jun. 7, 2023

(86) PCT No.: PCT/KR2023/007729

§ 371 (c)(1),
(2) Date: Dec. 6, 2024

(87) PCT Pub. No.: WO2023/239143

PCT Pub. Date: Dec. 14, 2023

(65) Prior Publication Data

US 2026/0010935 A1 Jan. 8, 2026

(30) Foreign Application Priority Data

Jun. 7, 2022 (KR) ........................ 10-2022-0069166

(51) Int. Cl.
*G06Q 30/0283* (2023.01)
*G05B 19/408* (2006.01)
(Continued)

(52) U.S. Cl.
CPC ..... *G06Q 30/0283* (2013.01); *G05B 19/4086* (2013.01); *G06Q 50/04* (2013.01); *G06T 17/30* (2013.01)

(58) Field of Classification Search
CPC ............... G06Q 30/0283; G06Q 50/04; G05B 19/4086; G06T 17/30
(Continued)

(56) References Cited

U.S. PATENT DOCUMENTS

| | | | | |
|---|---|---|---|---|
| 2014/0279177 A1* | 9/2014 | Stump | ................ | G06Q 30/0611 705/26.4 |
| 2016/0247289 A1* | 8/2016 | Pielawa | .............. | G06F 18/2323 |

FOREIGN PATENT DOCUMENTS

| | | | |
|---|---|---|---|
| JP | 08083105 | A | 3/1996 |
| JP | 2013246487 | A | 12/2013 |

(Continued)

OTHER PUBLICATIONS

"Multiprocess 3D printing for increasing component functionality" Published by Science Journals (Year: 2016).*
(Continued)

*Primary Examiner* — Zeina Elchanti
(74) *Attorney, Agent, or Firm* — Maine Cernota & Curran

(57) ABSTRACT

A computer program stored in a computer-readable storage medium, according to various embodiments of the present application, may comprise the steps of: acquiring coordinate information and vector information about a three-dimensional object from a design drawing file including the three-dimensional object; inputting coordinate information and vector information into a machining area determination model stored in a memory, so as to determine a machining area for the three-dimensional object; inputting the machining area into a machining method determination model stored in the memory, so as to determine a machining method for the three-dimensional object; inputting the machining method into a machining complexity determination model stored in the memory, so as to calculate the machining complexity of the machining method from machining information acquired from the machining
(Continued)

method; and inputting the machining complexity into a machining price estimation model stored in the memory, so as to select a price for machining the three-dimensional object.

8 Claims, 4 Drawing Sheets

(51) Int. Cl.
*G06Q 50/04* (2012.01)
*G06T 17/30* (2006.01)

(58) Field of Classification Search
USPC .......................................................... 705/400
See application file for complete search history.

(56) References Cited

FOREIGN PATENT DOCUMENTS

| | | | |
|---|---|---|---|
| JP | 2022069958 | A | 5/2025 |
| KR | 1019950000023 | B1 | 1/1995 |
| KR | 102250131 | B1 | 5/2021 |

OTHER PUBLICATIONS

International Search Report and Written Opinion with English Translation of PCT Appl. No. PCT/KR2023/007729, mail date Sep. 13, 2023, 15 pages.

* cited by examiner

PROCESSING ESTIMATE CALCULATION DEVICE USING ARTIFICIAL INTELLIGENCE AND OPERATION METHOD THEREOF

RELATED APPLICATIONS

This application is a national phase application filed under 35 USC § 371 of PCT Application No. PCT/KR2023/007729 with an International filing date of Jun. 7, 2023, which claims priority to KR Patent Application KR1020220069166, filed Jun. 7, 2022. Each of these applications is herein incorporated by reference in its entirety for all purposes.

TECHNICAL FIELD

The present invention relates to a processing quotation-providing device, and particularly a processing quotation-providing device in the field of artificial intelligence technology.

BACKGROUND ART

The present invention is a technology developed through the 2021 Campus Town Technology Matching Support Project CT210006 "Development of Manufacturing Artificial Intelligence for Processing Complexity and Processing Estimate Calculation" of the Seoul Business Agency in Seoul Metropolitan City. The present invention was also supported by the Industrial Technology Alchemist Project (Unique Project No. 2410000687; Project No. 00419010), research project titled "Manufacturing by Thinking: LLM-Linked Generative AI-Based Autonomous Design and Production Platform Technology," funded by the Ministry of Trade, Industry and Energy (MOTIE) of the Republic of Korea and managed by the Korea Planning & Evaluation Institute of Industrial Technology (KEIT), which was carried out by BOLTNNUT Co., Ltd. during the period from Apr. 1, 2024 to Dec. 31, 2024.

To calculate the processing cost for processing molds, etc. in the manufacturing industry, the operating time of a processing tool, the processing cost related to the operating cost of the processing tool, the cost of raw material required for processing, the cost for the time when the processing tool is not in operation, the cost of installing the processing tool, and the like are generally required.

In the existing manufacturing industry, a manufacturer must go through the processes of checking a drawing is delivered by a customer, calculating processing elements and time, and creating and delivering a quotation. In this case, there was a disadvantage in that the quotation was made by people, so it took an average of 4 days, resulting in a loss of time and a waste of manpower.

DISCLOSURE

Technical Problem

Therefore, the present invention has been made in view of the above problems, and it is one object of the present invention to dramatically shorten the time from requesting a quotation to receiving it by calculating a processing quotation using a model learned by a deep learning technique, and calculate and provide a more accurate quotation.

It is another object of the present invention to increase productivity and transaction volume in the manufacturing field by lowering the entry barriers to new manufacturing demand and minimizing time loss.

Technical Solution

In accordance with an aspect of the present invention, the above and other objects can be accomplished by the provision of a computer program stored in a computer-readable storage medium, the computer program including: a step of obtaining coordinate information and vector information on a three-dimensional object from a design drawing file including the three-dimensional object; a step of determining a to-be-processed region for the three-dimensional object by inputting the coordinate information and the vector information into a to-be-processed region-determining model stored in a memory; a step of inputting the to-be-processed region into a processing method-determining model stored in the memory, thereby determining a processing method for the three-dimensional object; a step of inputting the processing method into a processing complexity-determining model stored in the memory, and calculating processing complexity of the processing method from processing information obtained from the processing method; and a step of selecting a price for processing the three-dimensional object by inputting the processing complexity into a processing price-estimating model stored in the memory.

According to an embodiment, the to-be-processed region-determining model may be constructed by steps of constructing a to-be-processed region-determining model, wherein the steps of constructing a to-be-processed region-determining model are executed by the processor of the electronic device and includes: a step of reconstructing the three-dimensional object by defining an outer surface of the three-dimensional object based on the coordinate information and vector information on the three-dimensional object; a step of obtaining volume and length information on a raw material required for processing the three-dimensional object, based on the reconstructed three-dimensional object; and a step of determining a volume from an outer surface of the raw material to an outer surface of the reconstructed three-dimensional object as a to-be-processed region, according to the volume and length information on the obtained raw material.

According to an embodiment, the processing method-determining model may be constructed by steps of constructing a processing method-determining model, wherein the steps of constructing a processing method-determining model are executed by the processor of the electronic device and includes: a step of selecting at least one processing tool from among a plurality of processing tools, and determining a processing method of the selected processing tool, based on the outer surface and to-be-processed region of the three-dimensional object; and a step of determining the order of processing methods of the determined processing tool according to the outer surface and to-be-processed region of the three-dimensional object.

According to an embodiment, the steps of constructing a processing method-determining model may further include: a step of checking whether an unprocessed region exists in the to-be-processed region, after processing the to-be-processed region with the processing tool; and a step of selecting at least one additional processing tool from among the plural processing tools and selecting an additional processing method so as to perform processing on the non-processed region.

According to an embodiment, the multiple processing methods may be classified into a rough processing method and a finishing processing method, wherein the rough processing method is performed before the finishing processing method.

According to an embodiment, the processing information input to the processing complexity-determining model may include a processing tool, a processing time, a time taken for direction change of the three-dimensional object occurring during processing, and a time taken for changing the processing tool.

According to an embodiment, the processing complexity input to the processing price-estimating model may include a time taken for preparing a processing tool, a time taken for direction change of a three-dimensional object, a time taken for changing a processing tool, a raw material price, and a price of consumables required for processing.

Figure 1:
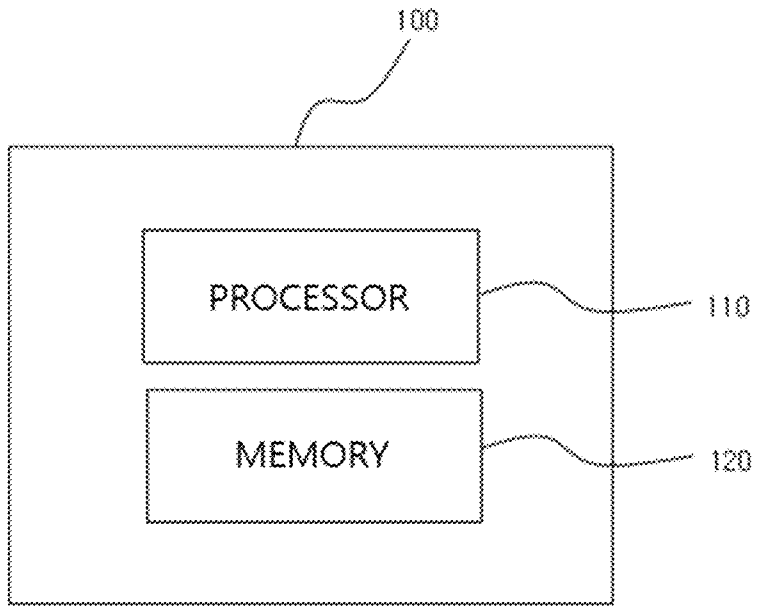
FIG. 1 illustrates a block diagram of an electronic device for calculating a processing quotation for a three-dimensional object according to various embodiments of the present invention.

The above drawings are provided as examples so that the idea of the present invention can be sufficiently conveyed to those skilled in the art.

Accordingly, the present invention is not limited to the accompanying drawings and may be embodied in other forms.

Throughout the specification, the same reference numbers refer to the same components.

In the accompanying drawings, it should be noted that certain parts are enlarged or reduced without proportion to the scale to aid understanding.

BEST MODE

Various embodiments are now described with reference to the accompanying drawings. In this specification, various descriptions are provided to provide an understanding of the present invention. However, it is apparent that these embodiments can be practiced without specific descriptions.

The terms "component," "module," "system," etc., as used herein, refer to a computer-related entity, hardware, firmware, software, a combination of software and hardware, or an execution of software. For example, a component may be, but is not limited to, a procedure running on a processor, a processor, an object, a thread of execution, a program, and/or a computer. For example, an application running on an electronic device and an electronic device can both be components. One or more components may reside within a processor and/or a thread of execution. A component may be localized within a single computer. A component may be distributed between two or more computers. In addition, these components can be executed from a variety of computer-readable media having various data structures stored therein. Components may communicate via local and/or remote processing, for example, according to signals having one or more data packets (e.g., data from one component interacting with another component in a local system or a distributed system, and/or data transmitted via signals to another system and/or over a network such as the Internet).

In addition, the term "or" is intended to mean an inclusive "or" rather than an exclusive "or". That is, unless otherwise specified or clear from context, "X utilizes A or B" is intended to mean either of natural inclusive permutations. That is, if X utilizes A; X utilizes B; or X utilizes both A and B, "X utilizes A or B" can be applied to any of these cases. In addition, the term "and/or" as used herein should be understood to refer to and include all possible combinations of one or more of the related items listed.

In addition, the terms "comprise" and/or "comprising" should be understood to mean that the feature and/or component is present. However, it should be understood that the terms "comprise" and/or "comprising" do not exclude the presence or addition of one or more other features, components, and/or groups thereof. In addition, unless otherwise specified or clear from context to refer to a singular form, the singular forms in this specification and the accompanying claims should generally be construed to mean "one or more".

In addition, the term "at least one of A and B" should be interpreted to mean "only including A," "only including B," and "a configuration of A and B."

Those skilled in the art should additionally recognize that the various exemplary logical blocks, configurations, modules, circuits, means, logics, and algorithm steps described in connection with the embodiments disclosed herein may be implemented as electronic hardware, computer software, or combinations of both. To clearly illustrate the interchangeability of hardware and software, various exemplary components, blocks, configurations, means, logics, modules, circuits, and steps have been described above generally in terms of their functionality. Whether such functionality is implemented as hardware or software depends on the particular application and design constraints imposed on the overall system. Skilled artisans can implement the described functionality in a variety of ways for each specific application. However, such implementation decisions should not be construed as causing the invention to be outside the scope of the present disclosure.

The description of the presented embodiments is provided to enable a person skilled in the art to make or use the present invention. Various modifications to these embodiments will be apparent to those skilled in the art of the present invention. The general principles defined herein may be applied to other embodiments without departing from the scope of the present invention. Thus, the present invention is not limited to the embodiments presented herein. The present invention should be interpreted in the broadest sense consistent with the principles and novel features disclosed herein.

In the present invention, the network function, the artificial neural network and the neural network can be used interchangeably.

Various embodiments described herein may be implemented in a computer (or similar device)-readable recording medium and storage medium using, for example, software, hardware, or a combination thereof.

In terms of hardware implementation, the embodiments described herein may be implemented using at least one of application-specific integrated circuits (ASICs), digital signal processors (DSPs), digital signal processing devices (DSPDs), programmable logic devices (PLDs), field programmable gate arrays (FPGAs), processors, controllers, micro-controllers, micro-processors, and other electrical units for performing functions. In some cases, the embodiments described herein may be implemented as a processor of an electronic device itself.

FIG. 1 illustrates a block diagram of an electronic device for calculating a processing quotation for a three-dimensional object according to various embodiments of the present invention.

FIG. 1 illustrates a simplified configuration of an electronic device 100. The electronic device 100 according to an embodiment of the present invention may include other components for performing a computing environment of the electronic device 100, and only some of the described components may constitute the electronic device 100.

The electronic device 100 may include a processor 110 and a memory 120. The processor 110 may be composed of one or more cores and may include a processor for data analysis and deep learning, such as a central processing unit (CPU), a general-purpose graphics processing unit (GPGPU), and a tensor processing unit (TPU), of the electronic device. The processor 110 may read a computer program stored in memory and perform data processing for machine learning according to one embodiment of the present invention.

For example, the processor 110 may typically control the overall operation of the electronic device 100. The processor 110 may provide or process appropriate information or functions to a user by processing signals, data, information, etc. that are input or output through the components examined above or by operating an application program stored in the memory 120.

In addition, the processor 110 may control at least some of the components of the electronic device 100 to drive the application program stored in the memory 120. Furthermore, the processor 110 may operate at least two or more of the components included in the electronic device 100 in combination with each other so as to drive the application program.

According to an embodiment of the present invention, the processor 110 may perform operations for learning a neural network. The processor 110 may perform calculations for learning a neural network, such as processing input data for learning in deep learning (DL), extracting features from input data, calculating errors, and updating the weights of a neural network using backpropagation. At least one of the CPU, GPGPU, and TPU of the processor 110 may process the learning of a network function. For example, a CPU and a GPGPU may process learning of a network function and data classification using a network function together.

In addition, in one embodiment of the present invention, the processors of multiple electronic devices may be used together to process the learning of network functions and data classification using network functions. In addition, a computer program executed in the electronic device according to one embodiment of the present invention may be a CPU, GPGPU, or TPU executable program.

According to one embodiment of the present invention, the memory 120 may store any type of information generated or determined by the processor 110 and any type of information received by a network part. According to one embodiment of the present invention, the memory 120 may include at least one type of storage medium among a flash memory type, a hard disk type, a multimedia card micro type, a card type memory (for example, an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The electronic device 100 may operate in relation to a web storage that performs the storage function of the memory 120 on the internet. The above description of the memory is only an example, and the present invention is not limited thereto.

Figure 4:
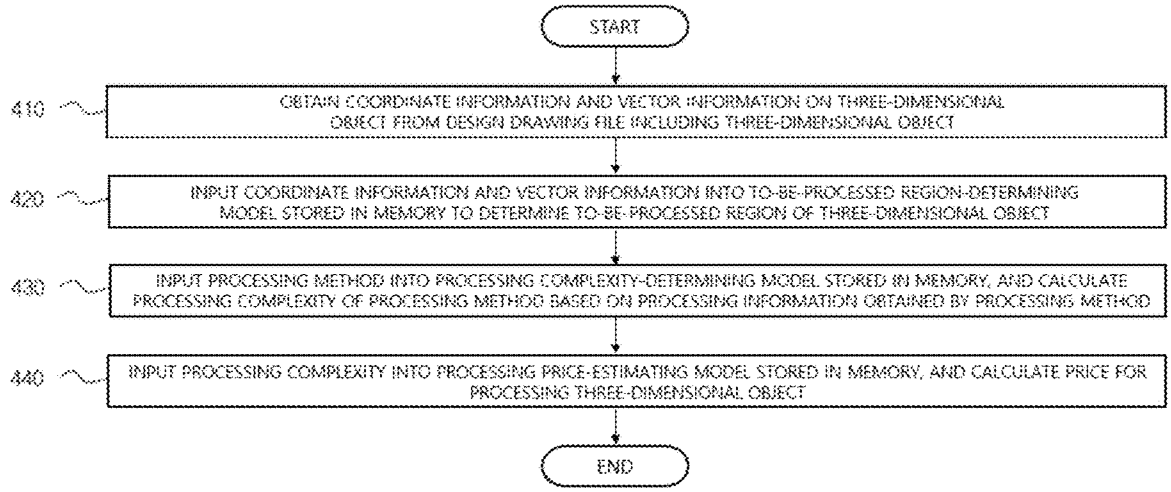
FIG. 4 illustrates a flowchart of calculating a processing quotation for a three-dimensional object by an electronic device according to various embodiments of the present invention.

FIG. 4 illustrates a flowchart of a processing quotation for a three-dimensional object calculated by the electronic device according to various embodiments of the present invention.

A step of calculating a processing quotation for a three-dimensional object described below may be performed by a processor of the electronic device 100. However, instead of performing direct calculations by CPU as in an existing method, information about a three-dimensional object is input into a plurality of models previously learned by a deep learning technique and stored in the memory 120 to check the output value, thereby allowing the entire processing quotation for a three-dimensional object to be confirmed.

In step 410, the processor 110 may obtain coordinate information and vector information for a three-dimensional object from a design drawing file including a three-dimensional object. The design drawing file may be a three-dimensional design drawing file, such as a drawing file with an extension of SPT, STEP, or STL, used in the manufacturing industry.

For example, the processor 110 may place a three-dimensional object included in a design drawing file on three-dimensional orthogonal coordinates such that it can be provided as input to models learned by a deep learning technique in a subsequent step, and may convert point and vector information on the orthogonal coordinates of the three-dimensional object into a language that artificial intelligence can recognize and convert.

In step 420, the processor 110 may input the coordinate information and the vector information into a to-be-processed region determination model stored in the memory 120, thereby determining a to-be-processed region for the three-dimensional object. Specific steps for determining the to-be-processed region for the three-dimensional object are illustrated in detail in accompanying FIG. 5.

Figure 5:
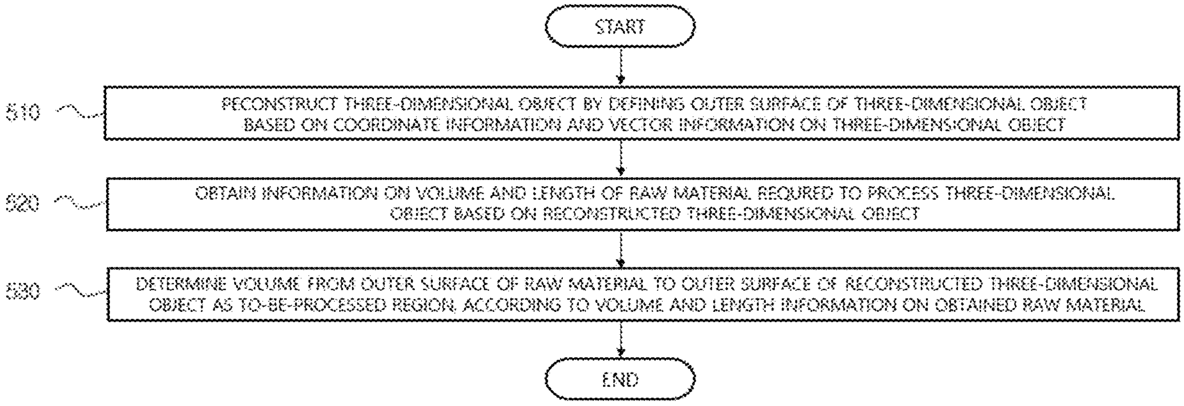
FIG. 5 illustrates a flowchart of steps of constructing a to-be-processed region-determining model by the electronic device according to various embodiments of the present invention.

FIG. 5 is a flowchart illustrating steps of constructing a to-be-processed region-determining model by the electronic device according to various embodiments of the present invention.

According to an embodiment of the present invention, a to-be-processed region-determining model may be constructed by steps of constructing a to-be-processed region-determining model. The steps of constructing the to-be-processed region-determining model may be executed through the processor 110 of the electronic device 100, and may be constructed through the following steps.

Figure 2:
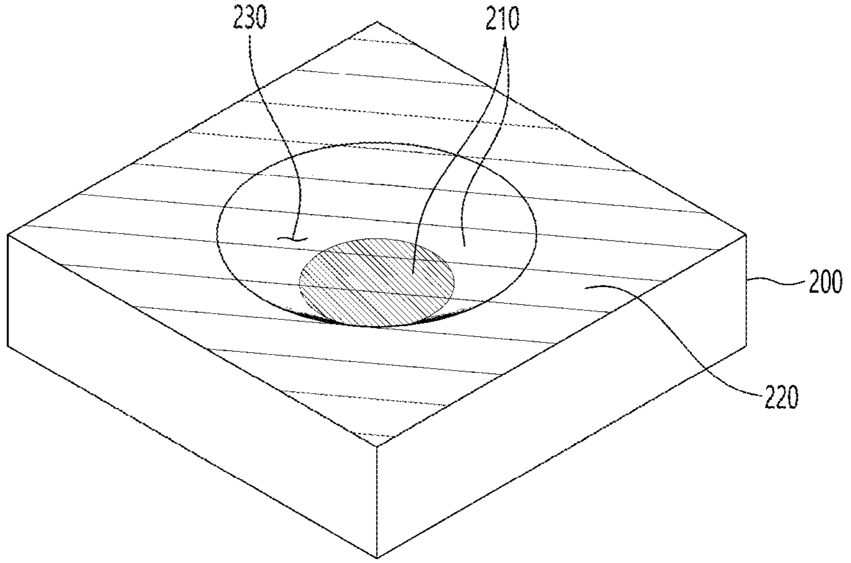
FIG. 2 illustrates a to-be-processed region of the three-dimensional object according to various embodiments of the present invention.

In step 510, the processor 110 may reconstruct a three-dimensional object 200 by defining the outer surface of the three-dimensional object 200 based on the coordinate information and vector information for the three-dimensional object 200. Referring to FIG. 2, the shape of the three-dimensional object 200 may be a shape that has been finally processed. For example, the three-dimensional object 200 may have an outer surface 210 processed by performing planar processing on the upper surface of the three-dimensional object 200. The three-dimensional object 200 may be reconstructed on three-dimensional coordinates by defining the entire shape of the three-dimensional object 200 including the outer surface 210. The shape of the three-dimensional object 200 reconstructed on the three-dimensional coordinates is described in detail in the accompanying FIG. 3.

In step 520, the processor 110 may obtain volume and length information on raw material required to process the three-dimensional object 200 based on the reconstructed three-dimensional object 200. As the volume and length information on the required raw material are obtained, the information may be input as an element in the price calculation to be performed later. As in FIG. 2 illustrated as an example, the raw material may be a rectangular solid having a flat upper surface 220. Here, the length information on the raw material is set to an error of within 5 millimeters including a processing error, so that the accuracy of a processing quotation may be ensured.

In step 530, the processor 110 may determine a volume from the outer surface of the raw material to the outer surface of the reconstructed three-dimensional object as a to-be-processed region based on the volume and length information of the obtained raw material. Referring to FIG. 2, a to-be-processed region 230 may be determined as a region between the upper surface 220, which is the outer surface of the raw material, and the processed outer surface 210 of the three-dimensional object 200. When the to-be-processed region 230 is determined, a method of processing the to-be-processed region 230 is determined by the processing method-determining model described below, and a processing quotation may be calculated based on the determined processing method.

Figure 6:
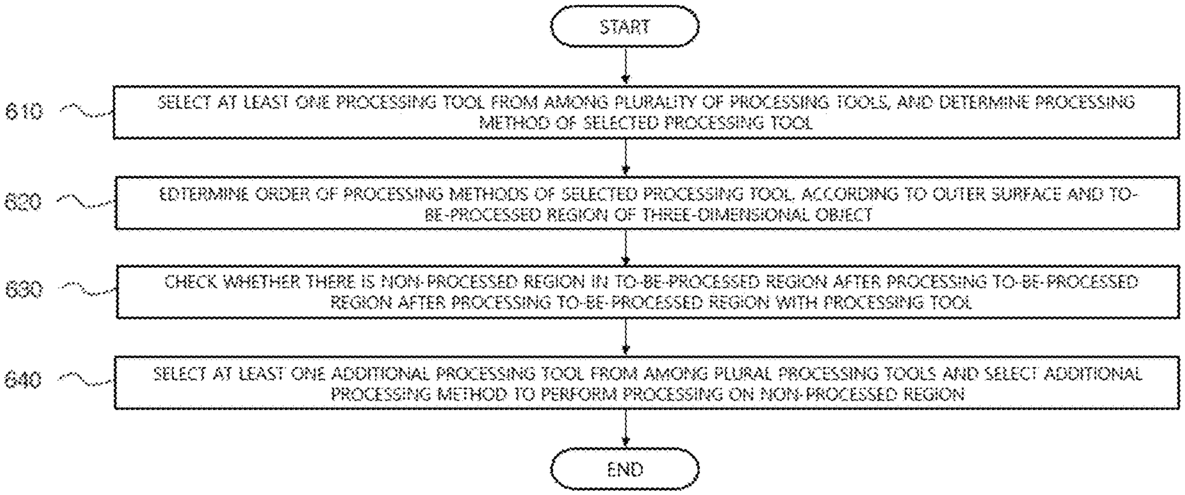
FIG. 6 illustrates a flowchart of steps of constructing a processing method-determining model according to various embodiments of the present invention.

Referring to FIG. 4 again, in operation 430, the processor 110 can input the to-be-processed region 230 into the processing method-determining model stored in the memory 120 to determine a processing method for the three-dimensional object. The model for determining the processing method is illustrated in detail in the accompanying FIG. 6.

According to an embodiment, the processing method-determining model may be constructed by steps of constructing a processing method-determining model. The steps of constructing a processing method-determining model may be executed through the processor 110 of the electronic device 100. The steps of constructing a processing method-determining model may include steps shown in FIG. 6.

In step 610, the processor 110 may select at least one processing tool among a plurality of processing tools based on the outer surface and to-be-processed region of the three-dimensional object 200 and determine a processing method for the selected processing tool. In step 620, the processor 110 may determine the order of a processing method by the determined processing tool according to the outer surface and to-be-processed region of the three-dimensional object. The processor 110 may determine a processing method for processing the to-be-processed region 230 based on the coordinate information and vector information of the three-dimensional object 200 when the three-dimensional object 200 is constructed in three-dimensional coordinates.

Figure 3:
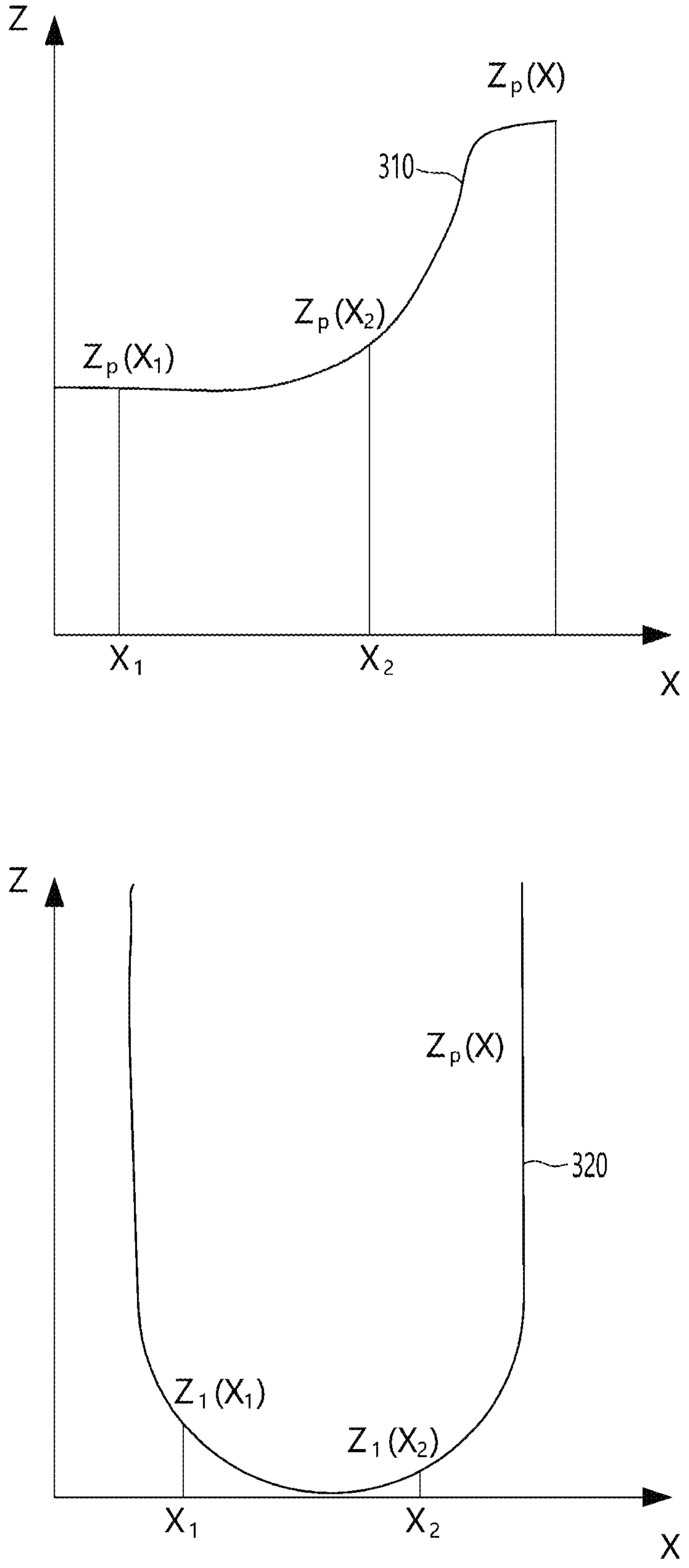
FIG. 3 illustrates a configuration for performing virtual processing by converting the three-dimensional object according to various embodiments of the present invention and a processing tool into coordinates.

Examining FIG. 3, the left graph is a graph displayed on x- and z-axes when a three-dimensional object 310 is converted to three-dimensional coordinates and has a specific y-axis value, and the right graph is a graph displayed on x- and z-axes when a processing tool 320 is converted to three-dimensional coordinates. FIG. 3 is an example to show that the three-dimensional object 310 and the processing tool 320 can be converted into three-dimensional coordinates, so a processing method, etc. can be mathematically considered, but the scope of the rights of the present invention is not limited thereto.

For example, the three-dimensional object may have $Z_P(X_1)$ or $Z_P(X_2)$ as a z value when the x value is $X_1$ or $X_2$ at a specific y value. In addition, the three-dimensional object 320 may be processed by the processing tool 320 in the x-axis direction and/or the z-axis direction until the z value becomes $Z_1(X_1)$ or $Z_1(X_2)$ when the x value is $X_1$ or $X_2$ at a specific y value.

According to an embodiment, the processing method-determining model may learn multiple processing methods for processing the to-be-processed region 230.

TABLE 1

| Characteristics | Selected processing method |
|---|---|
| Rotational symmetry | Lathe processing |
| Drilling hole with certain or larger diameter to penetrate object | Drilling |
| Flat processing | Milling |
| Local region/Precise processing | Laser processing |

For example, when the shape of an object is determined to be rotational symmetry, the processing method-determining model may select lathe processing as a method for processing a to-be-processed region. A lathe is a general term for a machine tool which applies a rotational motion to a workpiece and in which a cutting tool moves back and forth or left and right to cut in a cylindrical shape, and lathe processing may refer to processing performed using a lathe. In addition, when a hole with a certain or larger diameter penetrating the object exists in the object, it may be determined that drilling is required. When flat processing is required, it may be determined that milling is required. Milling may refer to a processing method of cutting an object using a machine tool that cuts a workpiece by rotating a milling cutter and performing linear movement up and down, left and right, and forward and backward.

Alternatively, when it is determined that local region processing and precise processing are necessary, laser processing may be performed. Laser processing is characterized by performing more precise processing because it performs processing intensively on a smaller region compared to the processing methods described above.

According to an embodiment, the processor 110 may confirm the processing direction for the to-be-processed region. When there are at least two directions orthogonal to one axis in the identified processing direction, a method of rotating a three-dimensional object may be included as a processing method.

According to an embodiment, the processor 110 may check whether there is a residual region that should be left in the to-be-processed region, as in undercut processing or island processing. The processor 110 may perform processing on the to-be-processed region, but may leave the residual region unprocessed by combining multiple processing tools and multiple processing orders.

According to an embodiment, the processor 110 may classify the processing method into a roughing step and a finishing step such that it can be performed similarly to processing to be actually performed, and perform processing according to the classification result. For example, the processor 110 may perform a processing method classified as a roughing step first compared to a processing method classified as a finishing step. The roughing step is mainly performed on a to-be-processed region with a large processing area, and has the advantage of fast processing speed, but has the disadvantage of a somewhat rough surface after processing. The finishing step has the disadvantage of having a small processing area and slow processing speed, but since the surface after processing is smooth, it has the characteristic that it can be performed in a finishing step of processing.

The processor 110 may determine the characteristics of the three-dimensional object based on the coordinate information and vector information of the three-dimensional object built on the three-dimensional coordinates. The processor 110 may determine which processing tools among a plurality of processing tools should be selected and in what order the selected processing tools should be processed, based on the determined characteristics. In addition, the processor 110 may process the raw material using the determined processing tools and processing order to process it into the shape of a three-dimensional object.

In step 630, the processor 110 may check whether a non-processed region exists in the to-be-processed region after processing the to-be-processed region with the processing tool. In step 640, the processor 110 may select at least one additional processing tool among the plural processing tools and select an additional processing method so as to perform processing on the non-processed region. The processor 110 may perform additional processing according to the selected additional processing tool and additional processing method.

In step 430, the processor 110 may input the processing method into a processing complexity-determining model stored in the memory 120, and may calculate the processing complexity of the processing method from the processing information obtained from the processing method. The processing complexity-determining model may be input with various elements such as processing tools, a processing time, the time taken for changing a processing tool direction, and the time taken for processing tool change, and may calculate processing complexity by learning the above-described elements. For example, processing complexity may be calculated as a parameter and used to calculate the processing price.

In step 440, the processor 110 may input the processing complexity into a processing price estimation model stored in the memory 120 to calculate the price for processing the three-dimensional object. Parameters for the processing complexity described above and material elements may be input into the processing price-estimating model so that the model can be learned. Material elements may include all material requirements required for processing, such as the price of a raw material and processing equipment consumables (e.g., end mills, etc.).

According to an embodiment, the processor 110 may input a processing price and budget information, input by a user, into a processing supplier matching model stored in the memory 120, thereby matching the three-dimensional object with information on at least one of a plurality of suppliers information stored in the memory.

According to an embodiment, the processing supplier-matching model may be constructed by steps of constructing a processing supplier-matching model, and the steps of constructing a processing supplier-matching model may be executed via the processor of the electronic device. The step of constructing the processing method-determining model may be learned by the following steps.

According to an embodiment, the processor 110 may calculate the daily production quantity and maximum production quantity for the actual processed product of the three-dimensional object based on the processing price and the budget information input by the user. The processor 120 may convert the processing price information, the budget information, the daily production volume and the maximum production volume into parameters, respectively. As a result of the conversion, multiple parameters may be generated. The processor 110 may calculate the similarity between the converted parameters and the plural company information stored in the memory, and select at least one company information from among the plural company information based on the calculated similarity. For example, at least one company information may be selected in order of high similarity, and the selected company information may be displayed and provided to the user.

Those skilled in the art will appreciate that information and signals may be represented using any of a variety of different technologies and techniques. For example, data, instructions, commands, information, signals, bits, symbols and chips that may be referenced in the above description may be represented by voltages, currents, electromagnetic waves, magnetic fields or particles, optical fields or particles, or any combination thereof.

Those skilled in the art will appreciate that the various exemplary logical blocks, modules, processors, means, circuits, and algorithm steps described in connection with the embodiments disclosed herein may be implemented as electronic hardware, various forms of program or design code (for convenience, referred to as software herein), or a combination of both. To clearly illustrate this interoperability of hardware and software, various exemplary components, blocks, modules, circuits, and steps have been generally described above in terms of their functionality. Whether these features are implemented as hardware or software will depend on a particular application and design constraints imposed on the overall system. Those skilled in the art may implement the described functionality in a variety of ways for each particular application, but such implementation decisions should not be construed as causing a departure from the scope of the present invention.

Various embodiments presented herein can be implemented as a method, an apparatus, or an article manufactured using standard programming and/or engineering techniques. The term "article manufactured" includes a computer program, carrier, or media accessible from any computer-readable storage device. For example, computer-readable storage media include, but are not limited to, magnetic storage devices (e.g., hard disks, floppy disks, magnetic strips, etc.), optical disks (e.g., CDs, DVDs, etc.), smart cards, and flash memory devices (e.g., EEPROMs, cards, sticks, key drives, etc.). In addition, the various storage media presented herein include one or more devices and/or other machine-readable media for storing information.

It should be understood that the specific order or hierarchy of steps in the processes presented is an example of exemplary approaches. Based on design priorities, it should be understood that the specific order or hierarchy of steps in the processes may be rearranged within the scope of the present invention. The accompanying method claims provide elements of various steps in a sample order, but are not meant to be limited to the particular order or hierarchy presented.

The description of the presented embodiments is provided to enable any person skilled in the art to make or use the present invention. Various modifications to these embodiments will be apparent to those skilled in the art, and the general principles defined herein may be applied to other embodiments without departing from the scope of the present invention. Therefore, the present invention is not to be limited to the embodiments presented herein, but should be construed in the broadest scope consistent with the principles and novel features presented herein.

The invention claimed is:

1. A non-transitory, computer-readable storage medium comprising a computer program, the computer program comprising:

a step of obtaining coordinate information and vector information on a three-dimensional object from a design drawing file comprising the three-dimensional object;

a step of determining a to-be-processed region for the three-dimensional object by inputting the coordinate information and the vector information into a to-be-processed region-determining model stored in a memory;

a step of inputting the to-be-processed region into a processing method-determining model stored in the memory, thereby determining a processing method for the three-dimensional object;

a step of inputting the processing method into a processing complexity-determining model stored in the memory, and calculating processing complexity of the processing method from processing information obtained from the processing method; and a step of selecting a price for processing the three-dimensional object by inputting the processing complexity into a processing price-estimating model stored in the memory, wherein the to-be-processed region-determining model is constructed by steps of constructing a to-be-processed region-determining model, wherein the steps of constructing a to-be-processed region-determining model are executed by a processor of an electronic device and comprises:

a step of reconstructing the three-dimensional object by defining an outer surface of the three-dimensional object based on the coordinate information and vector information on the three-dimensional object;

a step of obtaining volume and length information on a raw material required for processing the three-dimensional object, based on the reconstructed three-dimensional object; —wherein the reconstructed three-dimensional object occupies a region obtained by removing the to-be-processed region from a region occupied by the required raw material—and a step of determining a volume from an outer surface of the raw material to an outer surface of the reconstructed three-dimensional object as a to-be-processed region, according to the volume and length information on the obtained raw material.

2. The non-transitory, computer-readable storage medium according to claim 1, wherein the processing method-determining model is constructed by steps of constructing a processing method-determining model, wherein the steps of constructing a processing method-determining model are executed by the processor of the electronic device and comprises:

a step of selecting at least one processing tool from among a plurality of processing tools, and determining a processing method of the selected processing tool, based on the outer surface and to-be-processed region of the three-dimensional object; and a step of determining the order of processing methods of the determined processing tool according to the outer surface and to-be-processed region of the three-dimensional object.

3. The non-transitory, computer-readable storage medium according to claim 2, wherein the steps of constructing a processing method-determining model further comprises:

a step of checking whether an unprocessed region exists in the to-be-processed region, after processing the to-be-processed region with the processing tool; and a step of selecting at least one additional processing tool from among the plurality of processing tools and selecting an additional processing method so as to perform processing on the non-processed region.

4. The non-transitory, computer-readable storage medium according to claim 3, wherein the multiple processing methods are classified into a rough processing method and a finishing processing method, wherein the rough processing method is performed before the finishing processing method.

5. The non-transitory, computer-readable storage medium according to claim 1, wherein the processing information obtained from the processing method and input to the processing complexity-determining model comprises a processing tool, a processing time, a time taken for direction change of the three-dimensional object occurring during processing, and a time taken for changing the processing tool.

6. The non-transitory, computer-readable storage medium according to claim 1, wherein the processing complexity input to the processing price-estimating model comprises a time taken for preparing a processing tool, a time taken for direction change of a three-dimensional object, a time taken for changing a processing tool, a raw material price, and a price of consumables required for processing.

7. The non-transitory, computer-readable storage medium according to claim 1, comprising a step of matching the three-dimensional object with at least one supplier information among a plurality of supplier information stored in the memory by inputting the processing price, and budget information input by a user into a processing supplier-matching model stored in the memory.

8. The non-transitory, computer-readable storage medium according to claim 7, wherein the processing supplier-matching model is constructed by steps of constructing a processing supplier-matching model, wherein the steps of constructing a processing supplier-matching model are executed by the processor of the electronic device and the steps of constructing a processing method-determining model comprises:

a step of calculating a daily production quantity and a maximum production quantity for a processed product of the three-dimensional object based on the processing price and the budget information input by a user; and a step of converting the processing price information, the budget information, the daily production quantity and the maximum production quantity into parameters, respectively;

a step of calculating a similarity between the parameters and the plurality of supplier information stored in the memory, and selecting at least one supplier information among the plurality of supplier information based on the calculated similarity; and a step of displaying the selected supplier information through a display.

* * * * *